United States Patent
Arnald et al.

(10) Patent No.: US 9,811,858 B2
(45) Date of Patent: Nov. 7, 2017

(54) METHOD FOR ENROLLING AND AUTHENTICATING A CARDHOLDER

(71) Applicant: GEMALTO SA, Meudon (FR)

(72) Inventors: Valery Arnald, Meudon (FR); Sylvain Godbert, Meudon (FR); Philippe Mezger, Meudon (FR); Kanza Jaafar, Meudon (FR)

(73) Assignee: GEMALTO SA, Meudon (FR)

( * ) Notice: Subject to any disclaimer, the term of this patent is extended or adjusted under 35 U.S.C. 154(b) by 298 days.

(21) Appl. No.: 14/358,031

(22) PCT Filed: Nov. 14, 2012

(86) PCT No.: PCT/EP2012/072556
§ 371 (c)(1),
(2) Date: May 13, 2014

(87) PCT Pub. No.: WO2013/072335
PCT Pub. Date: May 23, 2013

(65) Prior Publication Data
US 2014/0324654 A1    Oct. 30, 2014

(30) Foreign Application Priority Data

Nov. 15, 2011    (EP) .................................... 11306494

(51) Int. Cl.
*G06Q 40/02*    (2012.01)
*G06Q 20/32*    (2012.01)
(Continued)

(52) U.S. Cl.
CPC ......... *G06Q 40/02* (2013.01); *G06Q 20/3276* (2013.01); *G06Q 20/3558* (2013.01); *G06Q 30/018* (2013.01); *G07F 7/10* (2013.01)

(58) Field of Classification Search
CPC ...................................................... G06Q 40/02
(Continued)

(56) References Cited

U.S. PATENT DOCUMENTS

| 5,640,835 A | 6/1997 | Muscoplat |
| 7,007,840 B2 * | 3/2006 | Davis ................ G06Q 20/02 235/380 |

(Continued)

FOREIGN PATENT DOCUMENTS

| JP | 2002099952 A | 4/2002 |
| JP | 2004178331 A | 6/2004 |

OTHER PUBLICATIONS

Otsuki Toyoji, Second Life Metaverse Business, Japan, SoftBank Creative, Nitta Mitsutoshi, Jul. 10, 2007, 1st edition, pp. 174-176 (A document showing well known art).
(Continued)

*Primary Examiner* — Olabode Akintola
*Assistant Examiner* — Paul R Kloberg
(74) *Attorney, Agent, or Firm* — The Jansson Firm; Pehr B. Jansson

(57) ABSTRACT

The invention relates to a method for enrolling and authenticating a bank's cardholder to a service provided by a service provider, characterized in that it comprises: a. receiving an identification cardholder data (ID) by a first channel; b. double-checking the identity of said cardholder by a second channel.

20 Claims, 2 Drawing Sheets

Figure 1:
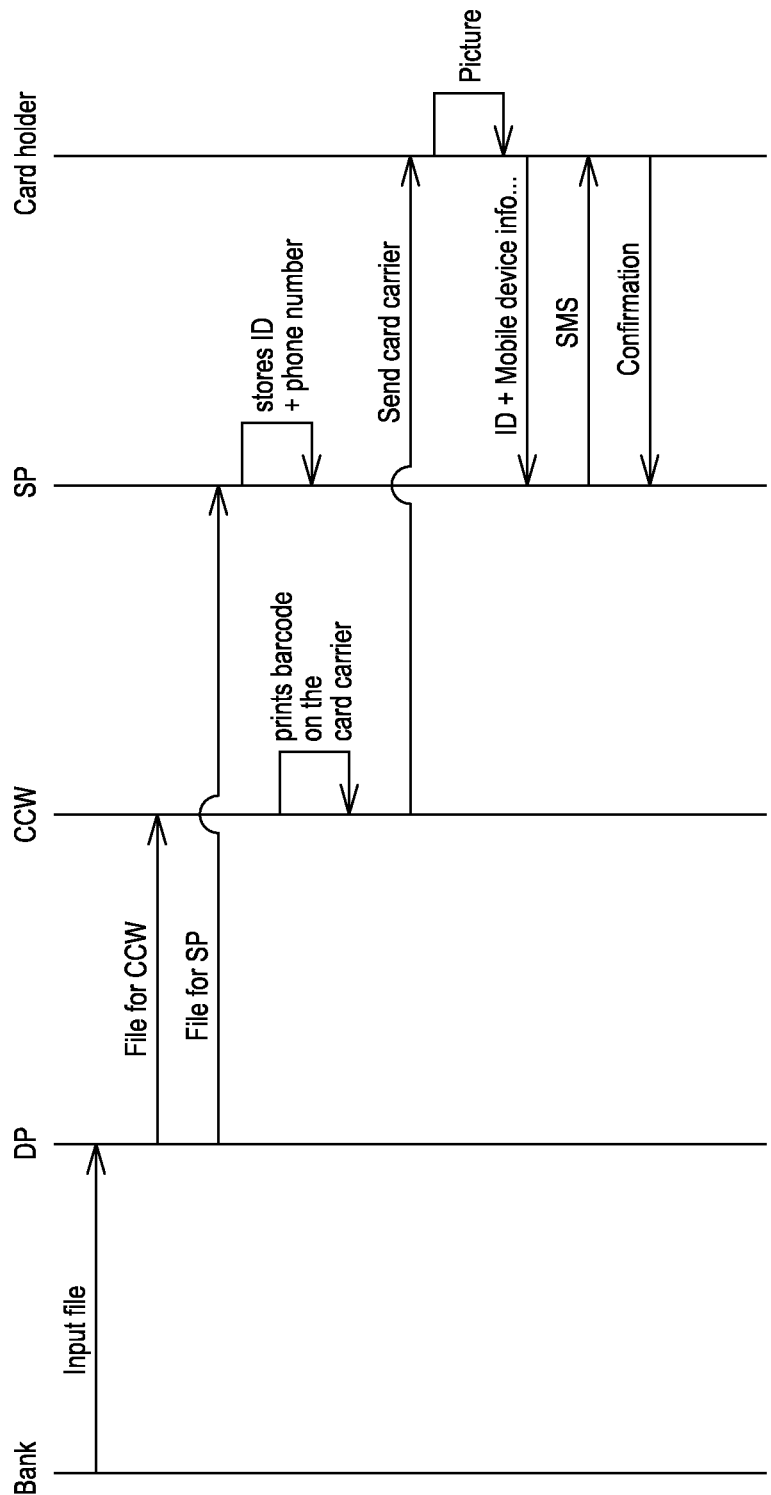

(51) Int. Cl.
*G06Q 20/34* (2012.01)
*G07F 7/10* (2006.01)
*G06Q 30/00* (2012.01)

(58) Field of Classification Search
USPC .......................................................... 705/35
See application file for complete search history.

(56) References Cited

U.S. PATENT DOCUMENTS

| | | | | |
|---|---|---|---|---|
| 7,380,708 | B1* | 6/2008 | Kiliccote | G06F 21/6209 235/380 |
| 7,600,676 | B1* | 10/2009 | Rados | G06Q 20/40 235/380 |
| 2006/0231611 | A1 | 10/2006 | Chakiris | |
| 2007/0194123 | A1* | 8/2007 | Frantz | G06K 17/0022 235/462.45 |
| 2008/0010190 | A1* | 1/2008 | Rackley, III | G06Q 20/042 705/39 |
| 2009/0119759 | A1* | 5/2009 | Taugbol | H04L 63/0853 726/6 |
| 2010/0057619 | A1* | 3/2010 | Weller | G06Q 20/02 705/67 |
| 2010/0312703 | A1* | 12/2010 | Kulpati | G06Q 20/32 705/44 |
| 2011/0112968 | A1* | 5/2011 | Florek | G06Q 20/20 705/50 |
| 2011/0131638 | A1* | 6/2011 | Kan | G06F 21/43 726/6 |
| 2011/0197267 | A1* | 8/2011 | Gravel | H04L 9/321 726/5 |

OTHER PUBLICATIONS

Shintaro Mizuno et al: "Authentication Using Multiple Communication Channels", Internet Citation, Nov. 11, 2005, pp. 54-62, XP002495045, ISBN 978-1-59593-232-7 Retrieved from the Internet: URL:http://delivery.acm.org/ [retrieved on Sep. 9, 2008] the whole document.

* cited by examiner

METHOD FOR ENROLLING AND AUTHENTICATING A CARDHOLDER

FIELD OF THE INVENTION

The present invention relates generally to banking enrollment process for cardholders and more specifically to a method for enrolling a bank's cardholder to a service provided by a service provider.

BACKGROUND OF THE INVENTION

More and more services available through smartphone application are developed. Applications may be sold to banks by a service provider and used by the banks' cardholders.

Currently, when a service provider wants to propose its services to a cardholder, there is problem for enrolling and authenticating the cardholder to these services. All the services have a similar, but independent enrollment process. Each service needs to verify the identity of the person and to register the user. The main problem being that only the bank has enough information to identify the cardholder. There is then a need to provide a common method for enrolling and authenticating a cardholder easily.

It is then an object of the invention to provide a method for enrolling and authenticating a bank's cardholder to a service provided by a service provider.

Thereto, the present invention provides a method characterised in that it comprises receiving an identification cardholder data (ID) by a first channel; double-checking the identity of said cardholder by a second channel.

According to other aspects of the invention, the method may comprise printing the identification cardholder data (ID) on a card carrier;
- the method may comprise printing the identification cardholder data (ID) on a banking card of the cardholder;
- a barcode may comprise the identification cardholder data (ID), authentication data and enrollment data provided by the bank or by the service provider, said barcode being printed on the card of the cardholder;
- the method may comprise sending said barcode printed to said card carrier to the cardholder;
- the method may comprise taking a picture or a scan of the barcode, deciphering data contained in the barcode with the mobile device and sending said data with an identification data of said mobile device to the service provider;
- the method may comprise an activation step using said second channel;
- the method may comprise sending to the cardholder an email comprising the identification cardholder data instead of sending a card carrier;
- the method may comprise sending the identification cardholder data to the cardholder in an SMS and double-checking the identity of the cardholder is checked in an email.

The invention also provides a use of an application on a mobile device for the enrollment and the authentication according to the proposed method.

Thanks to the invention, it is advantageously possible for the service provider to share a unique identification cardholder data to identify the cardholder between the service provider and the bank.

This invention takes fully benefits from the barcode that is used to enroll a bank's cardholder to the service provider's services without adding an extra enrollment process.

Figure 2:
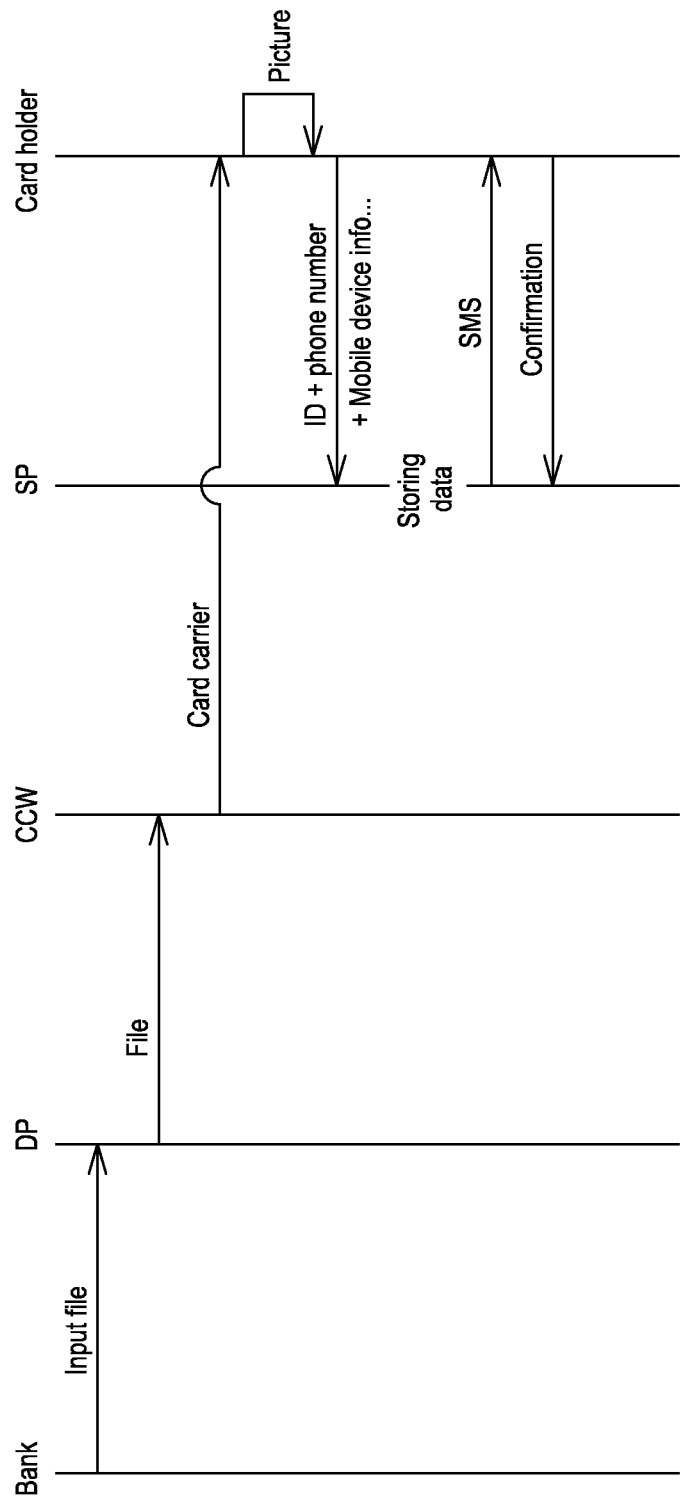

The various aspects, features and advantages of the invention will become more fully apparent to those having ordinary skill in the art upon careful consideration of the following Detailed Description, given by way of example thereof, with the accompanying drawings described below:

FIG. 1 schematically shows a flowchart diagram of a first embodiment of the invention;

FIG. 2 schematically shows a flowchart diagram of a second embodiment.

DETAILED DESCRIPTION

The present invention may be understood according to the detailed description provided herein.

Shown in FIG. 1 is a first embodiment of the invention wherein a service provider is adapted to propose available services to a bank's cardholder through a mobile device, such as for example a smartphone.

In order for the service provider to know which application belongs to which cardholder, the cardholder has to be properly enrolled and authenticated.

For doing so, an application on the smartphone is used for the enrollment and the authentication process. This application also provides services offered by the service provider SP to the cardholder.

A method according to the invention comprises receiving an identification cardholder data ID of a cardholder.

The service provider SP receives information comprising an identification cardholder data ID and the mobile number of the cardholder from the bank. More precisely, the bank sends an input file to a data-processing workshop DP. The input file comprises all information needed to make cards. For banking cards, it generally comprises the Pin code of the card, the text embossed on the card and other data that will be sent to the chip during the production of the card. This input file also comprises the identification cardholder data and the phone number of the cardholder. The data-processing workshop DP generates a file for a card-carrier workshop CCW that then generates a card carrier for the cardholder. The data-processing workshop DP also generates files that will be used for making the card.

The data-processing workshop DP also generates a file comprising the identification cardholder data and the phone number to the service provider so that the service provider SP is able to store all these information, as represented in FIG. 1.

The method comprises printing the identification cardholder data ID on a card carrier, i.e. the identification cardholder data ID of the cardholder is printed onto the card carrier of the cardholder and sent to the cardholder along with his banking card.

As described above, in this embodiment, the method comprises storing the identification cardholder data and the phone number of the cardholder by the service provider. The card carrier which is provided along with the banking card, has a barcode printed on it. This barcode comprises the identification cardholder ID. The barcode may also comprise authentication data and enrolment data provided by the bank or by the service provider.

When the first time the application is started, the method comprises taking a picture or a scan of the barcode printed on the card carrier. Once the picture or the scan is taken, the data comprised in the barcode is extracted and deciphered on the mobile device of the cardholder and sent to the service provider. Along with this data, an identification data of the mobile device also called mobile device information, is retrieved by the application and sent to the service provider.

Therefore, by simply taking a picture or a scan of this barcode the service provider has the identification data of the cardholder, the identification data of the mobile device and other enrollment data provided in the barcode.

Once the enrollment is successful, the method comprises creating a cardholder account by the service provider. The cardholder waits for an activation step of his account. The method comprises an activation step of the created account. The cardholder receives an activation message for example an SMS from the service provider which comprises for example a link the cardholder has to click in order to activate his account.

It will be well understood that the message can be in other format such as an email received on the mobile device of the cardholder. In this case, the email is provided by the bank in the input file instead of the phone number.

In order to complete the activation, the cardholder defines a password and confirms it. The service provider receives the password and activates the cardholder's account. The cardholder is then able to access to the different services.

Each time the cardholder authenticates to the service provider through the application, the identification data of the mobile device is checked among data sent during the enrollment process.

Thus, when the bank pushes information to the service provider, it also sends the identification cardholder data both with the information to the service provider. The service provider is then able to identify the cardholder that is intended to receive such information. The service provider is also able to localize the cardholder thanks to the identification data of the mobile device of the cardholder.

An example of services proposed through the application on the mobile device may consist in allowing a cardholder to receive his PIN code, or allowing the bank to send notifications to cardholders, or allowing a cardholder to choose a picture of his banking card from his mobile device. It will be well understood that such services are given as non limitative examples and other services can be proposed to a cardholder according to the method of the invention.

In a second embodiment of the FIG. 2, the data-processing does not generate a file to the service provider. As represented in FIG. 2, information on the cardholder such as the identification cardholder data and the phone number of the cardholder are not stored by the service provider. In this case these information are in the barcode, signed. Data are extracted from the barcode by the mobile device of the cardholder. In this embodiment, the service provider also receives the mobile number of the cardholder. The service provider checks the signature of the received data. The storage of the identification cardholder data, the phone number of the mobile device of the cardholder is made during the account creation step by the service provider.

In another embodiment, the card carrier comprises data as text including the identification cardholder data ID instead of a barcode. The cardholder can then use and enter directly such text when using the application.

In another embodiment, the identification cardholder data ID of a cardholder is printed onto the card directly. Other data such enrollment data and authentication data can also be printed on the card.

In another embodiment, the identification cardholder data ID of a cardholder is sent by email to the cardholder instead of in a card carrier. The identity of the cardholder is double-checked with another channel such as an SMS channel as described above.

In another embodiment, the identification cardholder data ID is sent by SMS to the cardholder. The identity of the cardholder is checked by another channel, for example by email. For doing so, the bank provides both the email and a phone number of the cardholder to the service provider.

It will be also understood that the identification cardholder data sent to the service provider by the bank may be different from the identification cardholder data received by the cardholder.

In this case, the service provider is responsible for linking these two identification cardholder data IDs.

According to another embodiment, the bank sends the identification cardholder data to the service provider and provides enough credentials so that the cardholder can be securely authenticated.

Thanks to this invention, the cardholder only enrolls to this application and gets access to all the services.

Another advantage is that once a bank has bought one service, getting one more service can be integrated flawlessly: the second service does not need an extra enrollment process. No matter how many applications the bank buys, the enrollment is the same.

The invention claimed is:

1. A method for enrolling and authenticating a bank's cardholder to a service provider to enable services of an application executing on the cardholder's mobile device, comprising the following steps applied by the service provider (SP):
   receiving on a first communication channel established between a data-processing workshop (DP) and the service provider (SP) a file comprising an identification cardholder data (ID) and a phone number of the cardholder previously emitted by the bank of the cardholder;
   storing cardholder ID and cardholder phone number;
   receiving from a mobile device operated by the bank's cardholder the identification cardholder data (ID), bank-provided enrollment data, and identification data of the mobile device via a second channel established between said mobile device and the service provider using the phone number of the cardholder;
   during activation of an application on the mobile device for use with the service provider, storing the identification cardholder data (ID), the bank-provided enrollment data, and the identification data of the mobile device;
   transmitting to the mobile device on a third channel, an activation link for the cardholder to use to activate an account with the service provider for use with the mobile device application;
   during post-activation use of the application to access services, transmitting the identification data of the mobile device and authenticating the mobile device by checking the mobile device identification data;
   using, by the service provider, the cardholder identification data linked to the mobile device identification data to determine services available to the cardholder; and
   proposing, by the service provider, services to the cardholder via the mobile application.

2. The method according to claim 1 further comprising printing the identification cardholder data (ID) on a card carrier.

3. The method according to claim 1 further comprising printing the identification cardholder data (ID) on a banking card of the cardholder.

4. The method according to claim 1, further comprising providing the cardholder with the card of the cardholder and wherein the card has printed thereon a barcode comprising an encoding of the identification cardholder data (ID), authentication data, and enrollment data provided by the bank or by the service provider.

5. The method according to claim 1, further comprising providing the cardholder with a card carrier and wherein the card carrier has printed thereon a barcode comprising an encoding of the identification cardholder data (ID), authentication data, and enrollment data provided by the bank or by the service provider.

6. The method according to claim 4, further comprising operating said mobile device to take a picture or a scan of the barcode, to decipher the data contained in the barcode including said identification cardholder data (ID), said authentication data, and said enrolment data, and to send on said second channel said cardholder data (ID), said authentication data, and said enrolment data as well as the identification data of said mobile device to the service provider.

7. The method according to claim 6, further comprising an activation step using said activation link over said second channel.

8. The method according to claim 1, further comprising sending to the cardholder an email comprising the identification cardholder data instead of sending a card carrier.

9. The method according to claim 1, further comprising sending the identification cardholder data to the cardholder in an SMS and double-checking the identity of the cardholder is checked in an email.

10. A method of using a mobile device for the enrollment and the authentication of a cardholder of a bank to a service provider to enable cardholder services by a service provider via an enrollment and authentication application executing on the cardholder's mobile device, the method comprising:
  operating the mobile device to activate the enrollment and authentication application of the mobile device by:
    receiving, by the enrolment and authentication application, an identification cardholder data (ID) on a first channel;
    transmitting, by the enrolment and authentication application, the identification cardholder data (ID) and mobile device identification data to the service provider on a second channel;
    receive, on a third channel, an activation link for the cardholder to use to activate an account with the service provider for use with the mobile device application;
    receive a confirmation from the service provider of the enrolment of the mobile device as an authentication device;
    during a post-activation use of the application to access services provided by the service provider, transmitting the identification data of the mobile device to the service provider; and
    receiving, by the enrolment and authentication application from the service provider, services to the cardholder via the mobile application.

11. The method of using a mobile device for the enrollment and the authentication of a cardholder of a bank to a service provided by a service provider of claim 10, further comprising printing the identification cardholder data (ID) on a card carrier.

12. The method of using a mobile device for the enrollment and the authentication of a cardholder of a bank to a service provided by a service provider of claim 10, further comprising printing the identification cardholder data (ID) on a banking card of the cardholder.

13. The method of using a mobile device for the enrollment and the authentication of a cardholder of a bank to a service provided by a service provider of claim 10, further comprising providing the cardholder with the card of the cardholder and wherein the card has printed thereon a barcode comprising an encoding of the identification cardholder data (ID), authentication data and enrollment data provided by the bank or by the service provider.

14. The method of using a mobile device for the enrollment and the authentication of a cardholder of a bank to a service provided by a service provider of claim 10, further comprising providing the cardholder with a card carrier and wherein the card carrier has printed thereon a barcode comprising an encoding of the identification cardholder data (ID), authentication data, and enrollment data provided by the bank or by the service provider.

15. The method of using a mobile device for the enrollment and the authentication of a cardholder of a bank to a service provided by a service provider of claim 13, wherein the enrollment and authentication application further causes the mobile device to take a picture or a scan of the barcode, to decipher the data contained in the barcode with the mobile device and to send on said second channel said cardholder data (ID), said authentication data, and said enrolment data as well as the identification data of said mobile device to the service provider.

16. The method of using a mobile device for the enrollment and the authentication of a cardholder of a bank to a service provided by a service provider of claim 10, wherein the enrollment and authentication application further causes the mobile device to perform an activation step using said activation link over said second channel.

17. The method of using a mobile device for the enrollment and the authentication of a cardholder of a bank to a service provided by a service provider of claim 10, further comprises sending to the cardholder an email comprising the identification cardholder data and double-checking the identity of the cardholder by transmitting an SMS to the cardholder.

18. The method of using a mobile device for the enrollment and the authentication of a cardholder of a bank to a service provided by a service provider of claim 10, further comprises sending the identification cardholder data to the cardholder in an SMS and double-checking the identity of the cardholder by transmitting an email to the cardholder.

19. The method according to claim 5, further comprising operating said mobile device to take a picture or a scan of the barcode, to decipher the data contained in the barcode including said identification cardholder data (ID), said authentication data, and said enrolment data, and to send on said second channel said cardholder data (ID), said authentication data, and said enrolment data as well as the identification data of said mobile device to the service provider.

20. The method of using a mobile device for the enrollment and the authentication of a cardholder of a bank to a service provided by a service provider of claim 14, wherein the operating the mobile device according to an application that further causes the mobile device to take a picture or a scan of the barcode, to decipher the data contained in the barcode with the mobile device and to send on said second channel said cardholder data (ID), said authentication data, and said enrolment data as well as the identification data of said mobile device to the service provider.

* * * * *